United States Patent
Eaves

(10) Patent No.: US 10,541,543 B2
(45) Date of Patent: Jan. 21, 2020

(54) DIGITAL POWER MULTIPORT BATTERY CHARGING SYSTEM

(71) Applicant: VoltServer, Inc., East Greenwich, RI (US)

(72) Inventor: Stephen S. Eaves, Charlestown, RI (US)

(73) Assignee: VoltServer, Inc., East Greenwich, RI (US)

( * ) Notice: Subject to any disclaimer, the term of this patent is extended or adjusted under 35 U.S.C. 154(b) by 32 days.

(21) Appl. No.: 15/795,451

(22) Filed: Oct. 27, 2017

(65) Prior Publication Data

US 2018/0123360 A1    May 3, 2018

Related U.S. Application Data

(60) Provisional application No. 62/415,111, filed on Oct. 31, 2016.

(51) Int. Cl.
*H02J 7/00*    (2006.01)

(52) U.S. Cl.
CPC .................................. *H02J 7/0021* (2013.01)

(58) Field of Classification Search
CPC .................................................... H02J 7/0021
USPC ........................................................... 320/109
See application file for complete search history.

(56) References Cited

U.S. PATENT DOCUMENTS

| | | | |
|---|---|---|---|
| 2004/0130292 A1* | 7/2004 | Buchanan | B60L 11/1811 320/116 |
| 2009/0204268 A1 | 8/2009 | Eaves | |
| 2012/0075759 A1 | 3/2012 | Eaves | |
| 2013/0103220 A1 | 4/2013 | Eaves | |
| 2015/0207318 A1 | 7/2015 | Lowe et al. | |
| 2015/0215001 A1 | 7/2015 | Eaves | |
| 2015/0306973 A1* | 10/2015 | Gunnerud | B60L 11/1861 320/162 |
| 2016/0111877 A1* | 4/2016 | Eaves | H02J 3/12 375/257 |
| 2016/0134331 A1 | 5/2016 | Eaves | |
| 2017/0214236 A1 | 7/2017 | Eaves | |
| 2017/0229886 A1 | 8/2017 | Eaves | |

OTHER PUBLICATIONS

U.S. Patent and TM Office, International Search Report and Written Opinion for PCT/US2017/058745 (corresponding PCT application) (dated Jan. 8, 2018).

* cited by examiner

*Primary Examiner* — Suresh Memula
(74) *Attorney, Agent, or Firm* — Modern Times Legal; Robert J. Sayre

(57) ABSTRACT

The disclosed charging system has multiple charging ports emanating from a central digital power transmitter to charge a plurality of battery packs. The system comprises a centralized bulk power converter to produce a first DC voltage and multiple additive power converters. One additive power converter is assigned to each charger port. The output of each charging port is transmitted in digital power format to a receiver local to each battery pack. The receiver converts the digital power to conventional analog DC power for charging the battery packs. The bulk converter provides the majority of the power needed to charge all the battery packs simultaneously, while the additive power converters adjust for the individual characteristics of each battery pack.

12 Claims, 11 Drawing Sheets

DIGITAL POWER MULTIPORT BATTERY CHARGING SYSTEM

RELATED APPLICATION

This application claims the benefit of U.S. Provisional Application No. 62/415,111, filed 31 Oct. 2016, the entire content of which is incorporated herein by reference.

BACKGROUND

Digital electric power, or digital electricity, can be characterized as any power format in which electrical power is distributed in discrete, controllable units of energy. Packet energy transfer (PET) is a new type of digital electric power protocol disclosed in U.S. Pat. Nos. 8,068,937, 8,781,637 (Eaves 2012) and U.S. Pub. Pat. Application No. US 2017/0229886 A1.

The primary discerning factor in a digital power transmission system compared to traditional, analog power systems is that the electrical energy is separated into discrete units; and individual units of energy can be associated with analog and/or digital information that can be used for the purpose of optimizing safety, efficiency, resiliency, control or routing. Since the energy in a PET system is transferred as discrete quantities, or quanta, it can be referred to as "digital power" or "digital electricity".

As described by Eaves 2012, a source controller and a load controller are connected by power transmission lines. The source controller of Eaves 2012 periodically isolates (disconnects) the power transmission lines from the power source and analyzes, at a minimum, the voltage characteristics present at the source controller terminals directly before and after the lines are isolated. The time period when the power lines are isolated was referred to by Eaves 2012 as the "sample period", and the time period when the source is connected is referred to as the "transfer period". The rate of rise and decay of the voltage on the lines before, during and after the sample period reveal if a fault condition is present on the power transmission lines. Measurable faults include, but are not limited to, a short circuit, high line resistance or the presence of an individual who has improperly come in contact with the lines.

Eaves 2012 also describes digital information that may be sent between the source and load controllers over the power transmission lines to further enhance safety or to provide general characteristics of the energy transfer, such as total energy or the voltage at the load controller terminals. One method for communications on the same digital power transmission lines as used for power was further described and refined in U.S. Pat. No. 9,184,795 (Eaves Communication Patent).

One application of a digital power distribution system is to safely distribute direct-current (DC) power in digital format and at elevated voltage from the source side of the system to the load side.

U.S. Pub. Pat Application No. 2016/0134331 A1 (Eaves Power Elements) describes the packaging of the source side components of Eaves 2012, in various configurations, into a device referred to as a digital power transmitter.

U.S. Pat. No. 9,419,436 (Eaves Receiver Patent) describes the packaging of various configurations of the load side components of Eaves 2012 into a device referred to as a digital power receiver.

In the receiver, the DC power is converted from digital format back to traditional analog DC format for use in commonly available power conditioning circuits. The Eaves Receiver Patent describes the employment of power conditioning circuits, widely known to the industry, to take an input voltage and produce a controlled alternating-current (AC) or DC output voltage. One example is a conditioner that takes a 380V DC input and creates a 12V DC output for use in a computer. A power conditioning circuit can also convert a DC input to an AC output, as is commonly found in uninterruptable power supplies or inverters. In its most basic form, a power conditioner is a simple switch that either allows or inhibits current flow. In another application, which is the subject of the present invention, digital power is converted in a receiver to be compatible with the voltage and current format necessary to charge a battery pack used for energy storage. More specifically, the battery pack may be incorporated into an electric vehicle, such as a warehouse lift truck or an electric automobile.

One aspect of the present invention is that the disclosed digital power charger system may manage the charging of multiple battery packs simultaneously. The concept of distributing power to various loads on a priority basis was introduced in U.S. Pub. Pat. Application No. 2015/0207318 A1, titled "Digital Power Network Method and Apparatus" (Lowe 2014). Lowe 2014 also introduced the concept of Power Control Elements (PCEs) to:

- perform safe transfer of energy under digital power format;
- convert from analog power to digital power under PET protocol, or vice versa;
- convert and/or control voltage and/or current; and/or
- switch power from one PET channel to another PET channel within the network.

Lowe 2014 introduced the concept of power conditioning circuits within the PCE to convert and/or control voltage and/or current. The Eaves Power Elements invention further expanded on the definition of power conditioning circuits, including AC-to-DC and DC-to-DC conversion that is relevant to the charging system of the present invention.

Lowe 2014 is relevant to the present invention not only for establishing a framework for routing energy on a priority basis to multiple battery pack chargers, but also to introduce the concept of power control elements that are further incorporated into the digital power transmitter of the Eaves Power Elements invention. Thus, the system described herein is equipped with components to format the voltage and current to charge a battery pack, as well as to prioritize the allocation of charging energy to the individual battery packs. As described herein, a common bulk power supply in the transmitter supplies the minimum charge voltage needed for all of the battery packs attached to the system.

Advantageously, the system can utilize a centralized, high power, bulk converter that supplies the majority of the charging load for multiple battery packs. The bulk converter is supplemented by a lower-power, controllable, additive power converter assigned to each charge port. From an approximately 20%-90% charge state, many battery chemistries, such as lithium-ion, operate in a relatively narrow voltage range. The bulk converter provides the voltage necessary to support the lower limit of the charge state (e.g., 20%), which constitutes the majority of the power requirement. Heretofore, conventional charging systems provided dedicated power converters for each battery pack, leaving power conversion capability underutilized or "stranded" when the battery pack has completed charging. Moreover, during charging, the power drawn by the battery starts high initially and then continuously tapers down as the charging continues, again leaving power conversion capability stranded. By using a central bulk converter, the power capability of the converter can be redirected based on the demand of multiple battery packs, all of which may be at a different state of charge. Although a focus of this specifications is electric automobiles, the system can be utilized with any battery pack—such as would be used in warehouse lift trucks, aerial vehicles (drones), automatically guided vehicles or portable batteries for lanterns or battery powered tools.

Conventional charging systems for electric vehicles (EVs) are separated into "levels" according to their power capability, with a "level 1" charger being the least powerful and a "level 3" charger, also referred to as a DC fast charger, being the most powerful. EV owners often pay more for fast charging versus slower charging. Due to the cost and space required for a level 3 charger, it is often impractical for a customer that is not interested in paying for a fast charge to occupy a level 3 charger. This can result in restrictions to access to customers, or manual moving of vehicles between faster chargers and slower chargers, as when a vehicle has completed the fast portion of the charging profile. As discussed previously, the situation is exasperated when a new customer requires charging and another vehicle owner remains plugged in to a level 3 charger after the vehicle no longer is consuming energy at a high rate.

A previous multiport charging system disclosed in U.S. Pat. No. 8,810,198 (Nergaard) employs a centralized power unit that can switch in one or more internal power converter stages to an individual charging port. The connection of the power converter stages to a charging port is accomplished using electro-mechanical or semiconductor switches. If the demand from one charging port is higher than others in the system, Nergaard offers the advantage of being able to direct the combined power from multiple power converter stages to the high-demand battery pack. For example, if there are three charge ports available but only one battery pack being charged, then all three power stages can be dedicated to the single battery pack. However, only one battery pack can be connected to any power stage to prevent the undesirable condition of battery packs being electrically connected to one another. A disadvantage of the invention of Nergaard is that the power bus structure, the number of power stages and the number of power switches reach a high level of complexity and cost after only a few charge ports. In regard to power switches, if there are N power stages and M charge ports, there is a need for 2×N×M switches. In addition to the many switches, an internal power bus with attachments to each switch pole is needed for each charge port. Since only one power stage can be connected to a battery pack, then at least one full power stage must be allocated to each battery pack attached to the system, despite the fact that the battery pack may be demanding very little from the power stage.

The disadvantage of the many power switches and internal buses of Nergaard is somewhat overcome in U.S. Pat. No. 7,256,516 (Buchanan), where a single AC-DC power converter stage is combined with multiple DC-DC power converter stages, and where each DC-DC stage is assigned to one or more charge ports. However, in the invention of Buchanan, the summation of power ratings of the DC-DC power stages is greater than the rating of the AC-DC power converter stage, resulting in a relatively large and expensive charging system because, if only a small number of the available charge ports are occupied, then each DC-DC converter must be rated to utilize a substantial portion of the power made available by the AC-DC power converter in order to deliver satisfactory charging performance to each port.

SUMMARY

A digital power charging system and a method for supplying digital power charging are described herein, where various embodiments of the apparatus and methods may include some or all of the elements, features and steps described below.

A multiport charging system of this disclosure includes a plurality of charging ports, a centralized bulk converter, a plurality of additive power converters, and a control circuit. The charging ports are configured to be coupled to a respective battery pack. The centralized bulk converter is electrically coupled with the charging ports and is controllable to provide a first output voltage selected to provide a majority of a total charge power required for recharging all battery packs attached to the charging ports. Each additive power converter is assigned to an individual charging port and is controllable to provide a second output voltage that, when added to the first output voltage, results in a predetermined charge to the charging port to which it is assigned. Meanwhile, the control circuit is configured to monitor at least the electrical current leaving each charging port to control at least the second output voltage of the additive power converters to individually control a charging current to the battery packs attached to the charging ports based on an algorithm that optimizes at least one factor selected from customer satisfaction, price of electricity, maximizing charge rate, available capacity from a power source, and battery life.

In a method for charging a plurality of battery packs, as described herein, a centralized bulk converter is controlled to provide a first output voltage through a plurality of charging ports to respective battery packs coupled with the charging ports. The first output voltage is selected to provide a majority of a total charge power required for recharging all battery packs attached to the charging ports. Additive power converters, each assigned to an individual charging port, are controlled to provide a second output voltage that, when added to the first output voltage, results in a predetermined charge to the charging port to which it is assigned. Furthermore, a control circuit is operated to monitor at least the electrical current leaving the charging ports to control at least the second output voltage of the additive power converters to individually control a charging current to the battery packs attached to the charging ports based on an algorithm that optimizes at least one factor selected from the following factors: customer satisfaction, price of electricity, maximizing charge rate, available capacity from a power source and battery life.

As described herein, a single bulk converter can be shared over many battery packs and additive power converters assigned to each charge port only need to be sized for a fraction of the power required by the attached battery pack. In contrast to Nergaard, the allocation of power to each charge port is determined by individual output adjustments to the additive power converters, and there is no need for expensive switches or a dedicated internal power bus for each charge port. In contrast to Buchanan, the summation of the ratings of the additive power converters can be made less than the power rating of the bulk converter, due to the innovation of the additive power converters adding only a portion of the total charging voltage required by the battery pack assigned to each port.

By providing a digital power link between the transmitter and receivers, a safe installation can be performed at minimal cost due to the avoidance of high cost labor, hard conduit and deep trenching requirements. Overload, ground fault and arc fault protection is inherent to digital power technology avoiding additional costs for external protection devices.

Finally, digital power technology has embedded control capability allowing easy implementation of charge control and energy management algorithms to optimize the factors of:

customer satisfaction by optimizing charger access, charging time, cost, battery pack life and performance, avoiding grid capacity overload and operational modes that would result in higher costs for electricity, and advantageous use of alternative energy sources.

The distribution of power may also be based on algorithms that take into account: 1) service levels to subscribers of the charging system, 2) preferred charging levels to deliver optimal battery life, battery charging speed, and relative levels of charging based on one or more of: a) battery chemistry; b) battery charge level at the moment; c) environmental conditions, including battery pack and ambient temperature; and d) shared demand of available charging power that takes into account the service levels purchased by the clients attached to the charging system. For example, a premium subscriber may be provided with a faster charge versus basic subscribers, and a battery pack from a particular vehicle may request to execute a unique charge profile that is stored in the memory of the battery pack controller and communicated to the local charge port to which it is attached.

Specifically, the system can allow the custodians of the charger system to implement custom algorithms to achieve the above factors and to allow battery pack manufacturers to initiate custom charge programs based on information communicated to the local charge port.

As will be described in more detail, below, the need to have discrete classes of chargers is somewhat alleviated with the system disclosed herein due to its novel ability to achieve a wide range of charging rates from all charging ports using relatively compact and cost efficient power conversion. The multiport architecture of the system allows what was previously classified as a level 3 charging port to have size, weight and cost characteristics similar to a level 2 charging port, and allows the port to freely transition across level 1, level 2 and level 3 charge rate capabilities.

Figure 1:
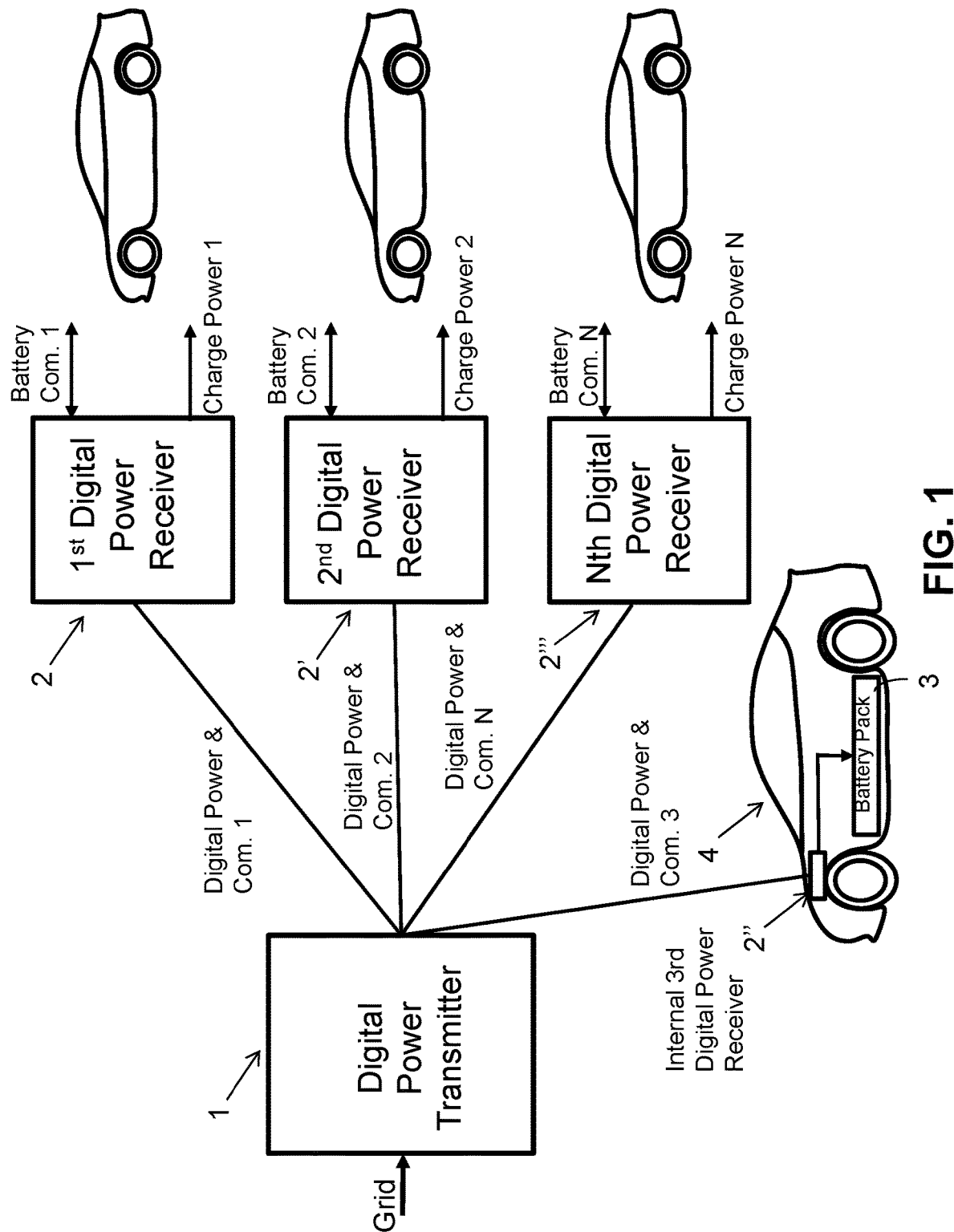
FIG. 1 is a block diagram of a digital power charging system.

In the accompanying drawings, like reference characters refer to the same or similar parts throughout the different views; and apostrophes are used to differentiate multiple instances of the same or similar items sharing the same reference numeral. The drawings are not necessarily to scale; instead, an emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Disclosed herein is a unique combination of power conditioning circuitry, digital power receivers and a digital power transmitter that can improve or optimize factors of safety, efficiency, resiliency, control and routing of power, and that can prioritize digital power delivery across multiple loads based on a predetermined priority scheme. In systems described herein, digital power components are configured for the purposes of charging one or more battery packs from a central transmitter.

The digital power transmitter can be supplied with AC grid power. Within the transmitter, a bulk AC-DC power converter converts the AC power to DC. The DC power has a minimum voltage that is sufficient to charge battery packs that are at a predetermined minimum state of charge. For battery packs below the minimum state of charge, a separate method is employed, as will be described later in this specification. The transmitter also contains an additive power converter for each of the charging ports. The additive power converter can be local to the bulk converter (wherein the distance between the additive power converter and the bulk power converter is less than 25% of the total distance between the bulk power converter and the charging port or battery pack) or the additive power converter can be local to the battery pack being charged (wherein the distance between the additive power converter and the charging port or battery pack is less than 25% of the total distance between the bulk power converter and the battery pack or charging port).

The additive power converter output voltage and/or current is adjustable from the transmitter controller. The voltage of the additive power converter is added to the bulk power converter voltage. The resulting summed voltage is managed by the transmitter controller to maintain a predetermined charge rate for the battery pack with which the charger port is associated. Before leaving the transmitter, the power on the charger port is converted to digital power format for the purposes of safe distribution to the digital power receiver local to the battery pack/charging port (wherein the distance between the digital power receiver and the battery pack/charging port is less than 25% of the total distance between the digital power transmitter and the battery pack/charging port).

A receiver associated with each charging port receives the digital power and converts it back to conventional analog DC power to charge the battery pack. Data communication between the battery pack and the receiver and receiver and transmitter allow the intelligent management of the distribution of power from the transmitter to the individual charger ports. The distribution of power may also be based on algorithms that take into account service levels to subscribers of the charging system. For example, a premium subscriber may be provided with a faster charge versus basic subscribers.

A block diagram of the system is provided in FIG. 1, where a digital power transmitter 1 provides multiple digital power outputs to a plurality of digital power receivers 2, 2', 2", 2'". The receivers 2, convert the digital power back to analog DC power for charging the battery packs 3 internal to the motor vehicles 4 in FIG. 1. In one depiction, the receiver 2" is placed internal to an electric vehicle 4, thus eliminating the exposure of the user to conventional (non-digital) electricity.

Figure 2:
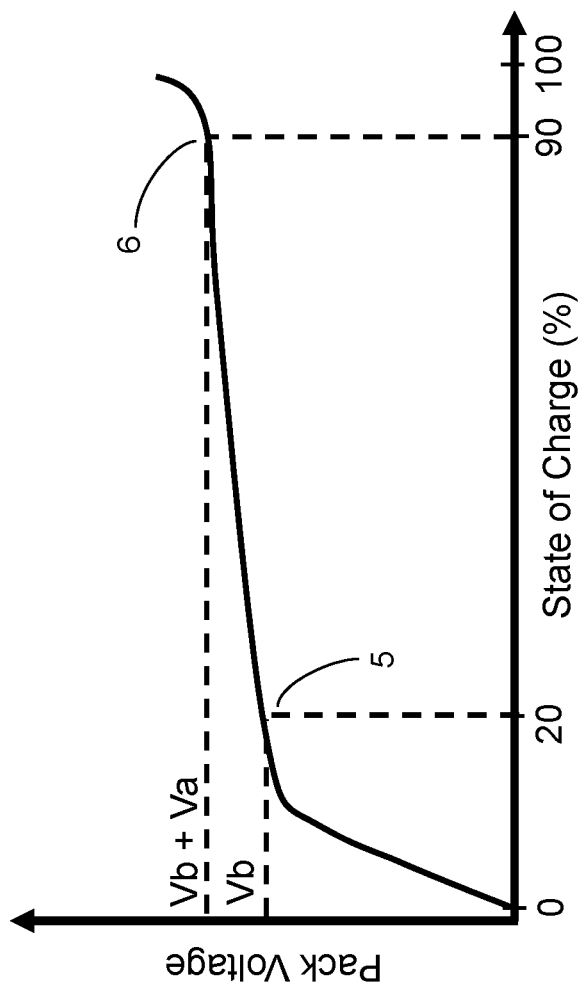
FIG. 2 is a graph showing a representative charging voltage profile of a battery pack.

A concept relevant to the operation of this system is the voltage versus state-of-charge relationship in typical battery packs. A representative voltage/charge-state profile is depicted in FIG. 2. At a 0% charge state, the output voltage of a battery pack is essentially zero. The voltage rises relatively quickly with the stored charge to the start of a first plateau 5. For example, in the case of lithium-ion batteries, the transition to the first plateau occurs at a charge state of approximately 20% of maximum. After reaching the first plateau, the voltage changes at a much lower rate until reaching a charge state of approximately 90% charge state 6, after which the voltage then begins to increase at a higher rate. In fast-charge applications, the charger is often programmed to stop when reaching a charge state of approximately 80% since, after this point, the capability of the battery to rapidly accept charge diminishes, making it more practical to move the vehicle away from the charger to allow others to utilize it.

Figure 3:
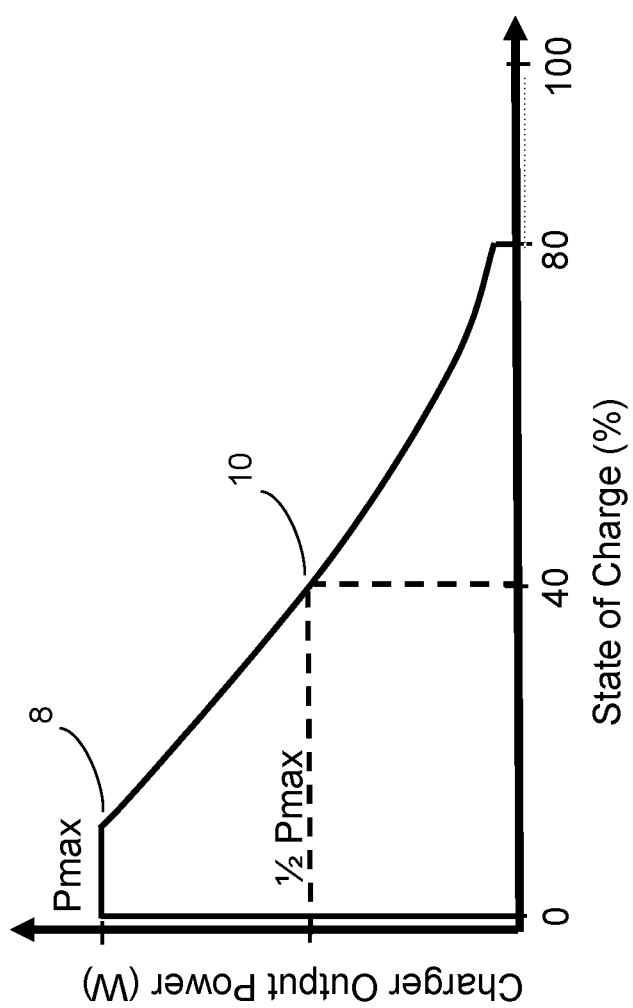
FIG. 3 is a graph showing a representative charging power profile of a battery pack.

FIG. 3 shows the relationship of charger output power versus the charge state of the battery pack. At low charge states, the output power delivered by the charger to the battery pack is at its maximum up to point 8. The output power then decreases fairly quickly as the battery further charges. In the representative example of FIG. 3, the power decreases to 50% of the maximum at point 10 when the battery reaches a charge state of approximately; at which point, only ½ of the power capability is being utilized. The situation is worse if the battery is already at 50% or more of maximum charge when the charging begins, which may be a fairly common occurrence with electric vehicles. At an initial charge state of 50% of maximum, the output of the charger would immediately drop to ½ or less of its capability leaving the charger underutilized. As described earlier, vehicle operators often leave the vehicle at the charger long after it has completed its charge, thereby severely underutilizing an expensive resource.

The relevance of FIG. 2 to the operation of the present system is that a single, high-power bulk converter can be used to generate a voltage close to the start of the first plateau 5, represented by Vb in FIG. 2. As multiple battery packs are being charged, smaller additive power converters can be used to make up the difference in voltage, Va, between Vb and the final charge voltage at point 6. During the charge process, the voltage of the bulk converter is held relatively constant, and the voltages of the additive power converters, one assigned to each battery pack, are adjusted to maintain a predetermined charge current.

The ratings of the additive power converters only need to be a fraction of (i.e., is less than) the rating of the bulk converter according to the relative voltage ratio. For example, if the bulk converter is rated to 30 kW at 320 VDC, and the additive power converter can generate a maximum of 60 VDC (allowing a total charger output of 380 VDC), the additive power converter would require a power rating that is only a fraction of the 30 kW converter according to the ratio of 30 kW*60V/320V=5.6 kW. This would provide a combined charge capability of 35.6 kW. More specifically, according to the example depicted in FIG. 3, when the battery can only accept 50% of the charger capabilities, only ½ of the additive supply, or 2.8 kW, is left unutilized and the entirety of the 30 kW bulk supply is left available to charge other battery packs. This approach is opposed to that of a conventional charger, where ½ of the entire 35.6 kW, or 17.8 kW, is left unutilized.

Figure 4:
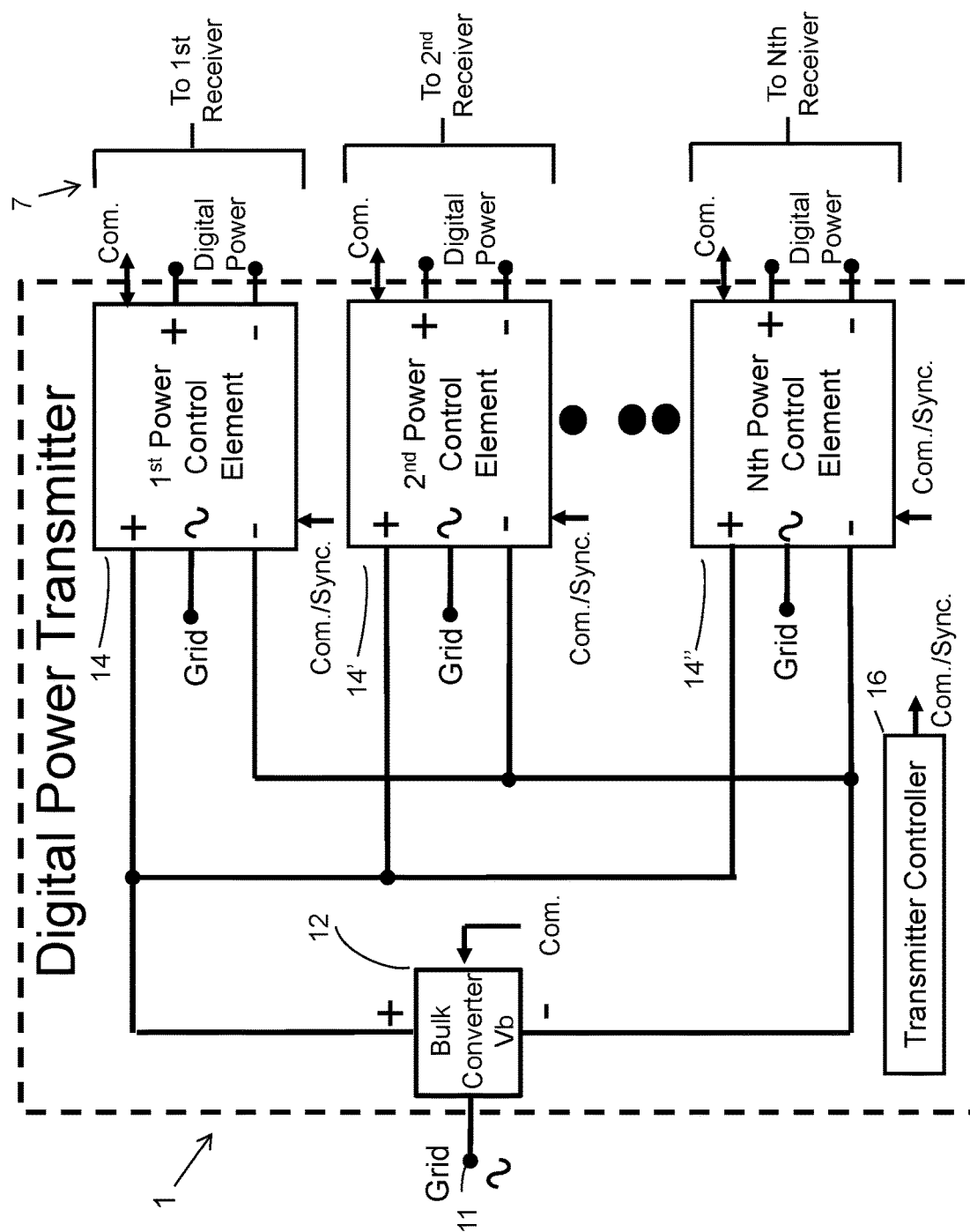
FIG. 4 is an internal block diagram of a digital power transmitter.

A representative digital power transmitter 1 is shown in FIG. 4. The bulk converter 12 is supplied by the AC grid 11. As previously described, the bulk converter 12 provides a first charge voltage, Vb, that is supplemented by a series of additive power converters that are contained within power control elements 14, 14', 14". The bulk converter 12 is responsive to communication signals communicated via a communication line 17 from a transmitter controller 16 to set the proper bulk charge voltage for the battery packs 3 connected to the system. The transmitter controller 16 is also communicative to power control elements 14, 14', 14" for managing the charging of individual battery packs 3.

Figure 5:
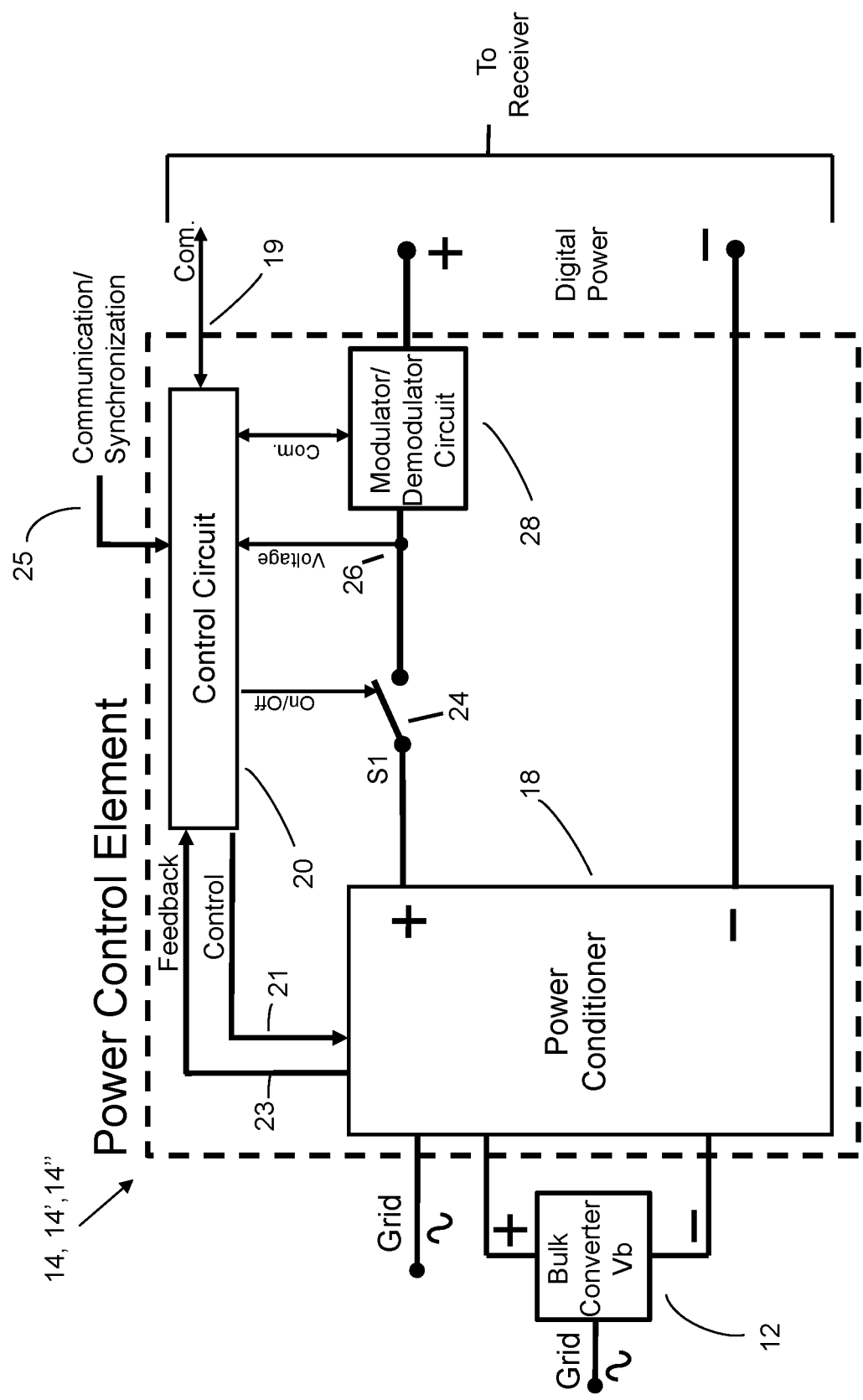
FIG. 5 is a block diagram of a power control element.

A representative power control element 14 is shown in FIG. 5. Lowe 2014 introduced the concept of power control elements (PCEs) with two of the primary functions being to convert voltage and/or current and to perform safe transfer of energy under digital power format using packet energy transfer (PET) protocol, defined in Eaves 2012. To convert voltage or current, Lowe 2014 introduced the concept of a power conditioning circuit 18, which is depicted in FIG. 5. The Eaves Power Elements invention further expanded on the definition of power conditioning circuits, including the AC-to-DC converter 22.

Referring to the power control element 14 of FIG. 5, power conditioning circuit 18 receives supervisory control 21 from, and provides feedback 23 to, element control circuit 20. As described in the Eaves Power Elements application, element control circuit 20 can provide very-low-level control to the power conditioning circuit 18, such as the control of individual power semiconductor switches used in power conversion; in additional embodiments, element control circuitry 20 can provide very high level functions that supplement the low-level control performed by an embedded controller that resides as part of power conditioning circuit 18.

Figure 6:
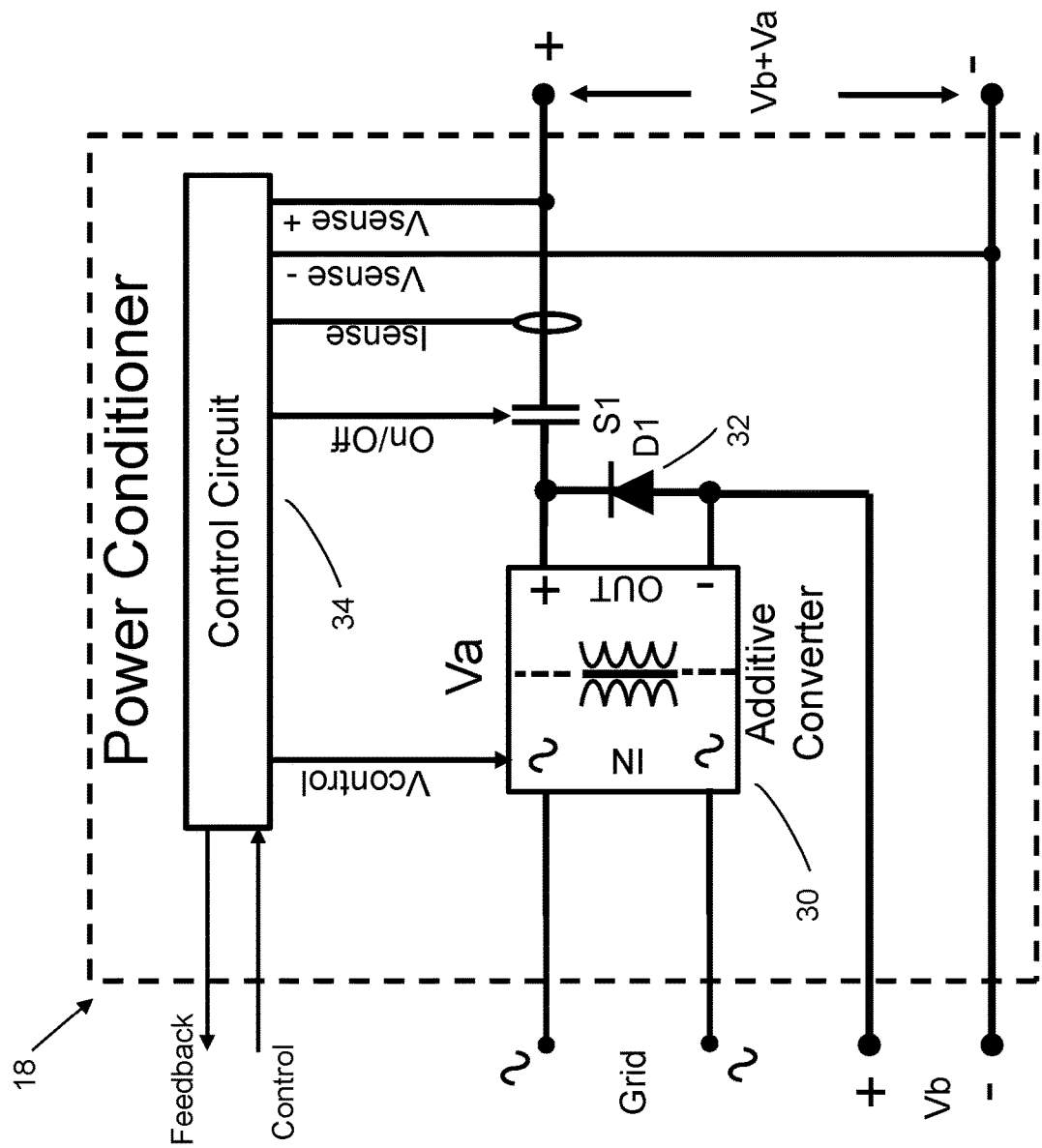
FIG. 6 is a block diagram of a power conditioner for use inside a digital power transmitter.

Referring to FIG. 6, AC-DC additive power converter 30 is of the galvanic isolated type well known to those skilled in the art. Diode (D1) 32 protect the converter 30 from an overvoltage condition if the converter 30 attempts to shut down its output when delivering power. As shown in FIG. 6, the negative output terminal of the additive power converter 30 is connected to the positive output of the bulk converter 12. The voltage produced by additive power converter 30 is symbolized as Va. The voltage produced by bulk converter 12 is symbolized as Vb. The resulting combined output is the summation Vb+Va. The output voltage of the additive power converter 30 is controllable via power conditioner control circuit 34 and further through supervisory communication/synchronizing line (com./sync.) 25 from the transmitter controller 16 of FIG. 4.

Element control circuitry 20 manages a disconnect device (S1) 24, that is needed to convert the Vb+Va output to digital power format by executing the packet energy transfer (PET) protocol described in detail in Eaves 2012. Disconnect device (S1) 24 can be a power semiconductor device but may also take other forms, such as an electromechanical relay. Voltage sensing point 26 is used to provide feedback voltage when executing PET protocol.

Figure 7:
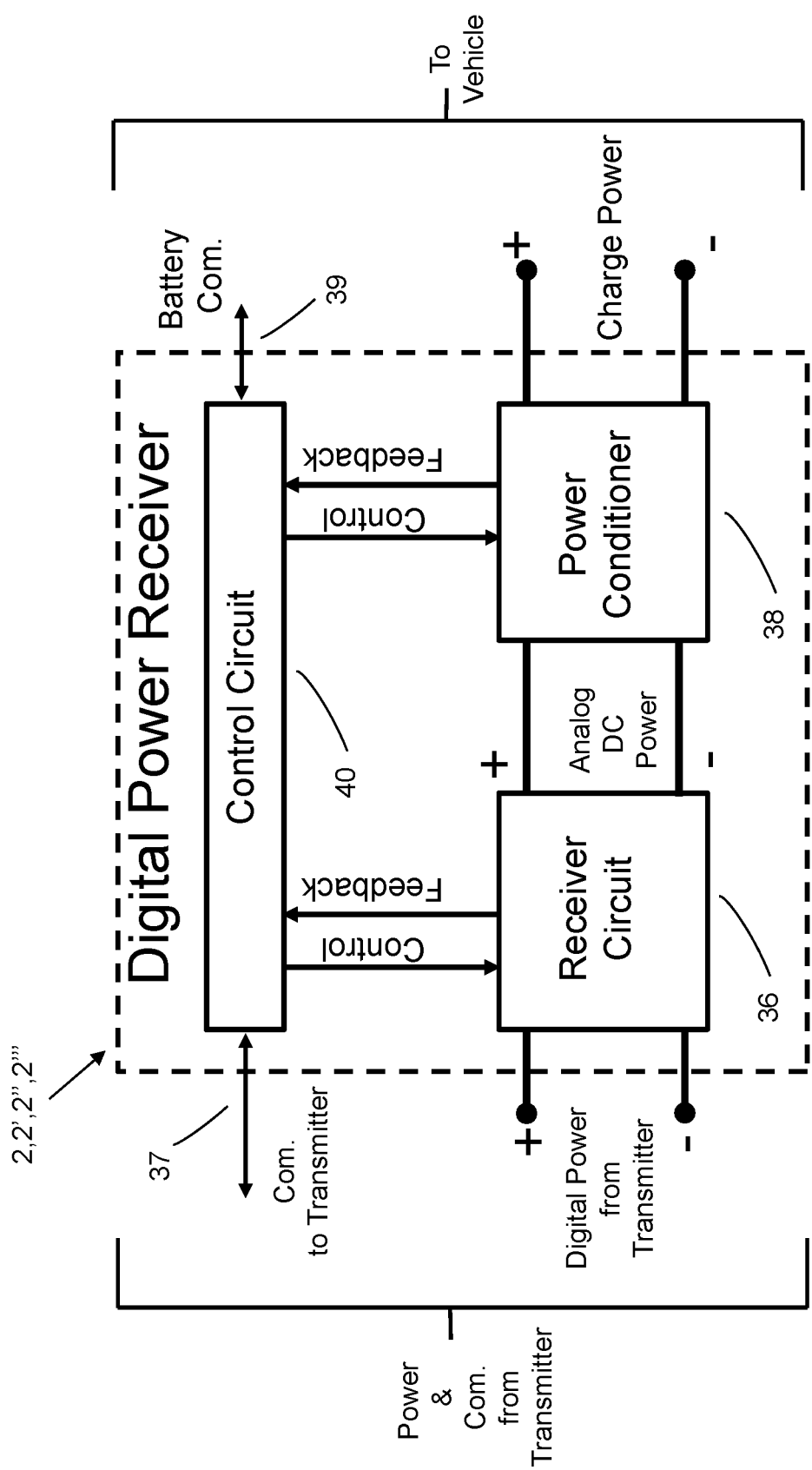
FIG. 7 is a block diagram of a digital power receiver.

Referring to FIG. 4, after digital power leaves one of the power control elements 14, 14', 14", it travels on a transmission line 7 to a digital power receiver 2 adjacent to the battery pack 3 being charged, as depicted in FIG. 1. FIG. 7 depicts one of the receivers 2 that is typical for all of the receivers in the charging system. As described in the Eaves Receiver Patent, the digital power is first converted back to analog DC electricity by the receiver circuit 36.

Figure 8:
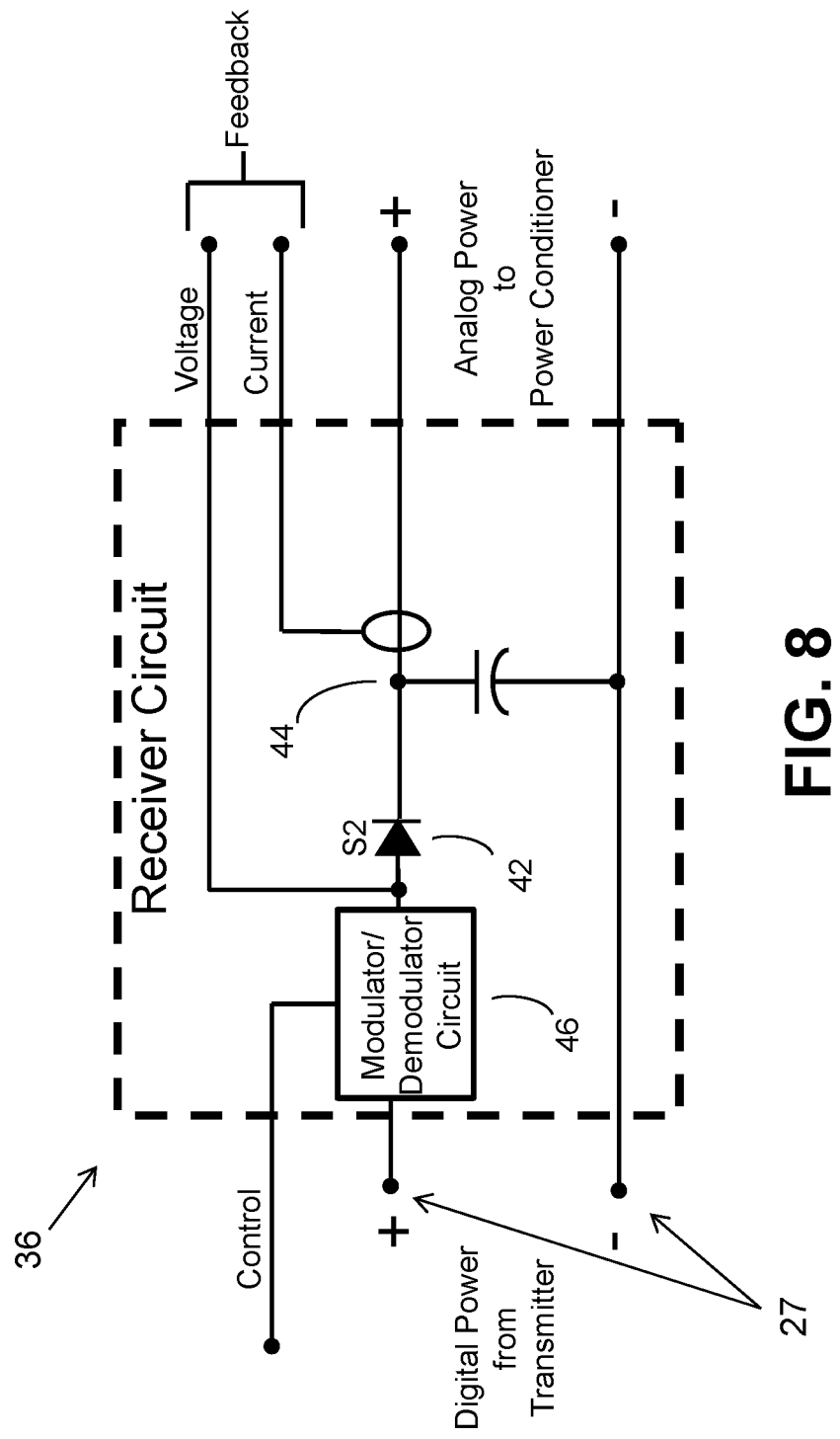
FIG. 8 is a block diagram of a receiver circuit.

An instance of a receiver circuit 36 is shown in FIG. 8. The purpose of the receiver circuit 36 is to convert the digital power on the conductor pair 27 back to conventional analog electricity that no longer comprises discrete units or pulses. This conversion is performed by rectification, either actively (using a controllable switch) or passively (using a diode). The rectification is performed by switch (S2) 42, which inhibits current flow from the receiver DC link 44 back into the transmission lines 7 via the conductor pair 27 when the transmitter 1 terminates an energy pulse. The transmitter 1 terminates the energy pulse by opening its own switch (S1) 24 of FIG. 5 on the transmitter side of the system. At this point, the transmission pairs are electrically isolated from both the transmitter and the receiver, allowing at a minimum, the transmitter to analyze the transmission line at voltage sense point 22 of FIG. 5 to determine if the voltage decay is within predetermined parameters as described in Eaves 2012.

Switch (S2) 42 of FIG. 8 can comprise a bi-directional switch that allows current flow in either direction. The receiver circuits would then be combined with bi-directional power conditioning circuits. This combination allows power to flow in reverse from the output of the power conditioning circuits, back through the receiver circuits and into the transmission line pairs. This ability is useful in cases where the load can reverse roles and become a source of energy. For example, where the battery packs is used to supply energy back to the charger system, sometimes referred to as vehicle-to-grid powering.

Referring to the receiver 2 of FIG. 7, the control circuit 40 can send communications signals via a control line 39 to the modulation circuit 46 of FIG. 8. The modulation circuit 46, using techniques commonly known to the industry, superimposes and modulates a carrier frequency on the transmission line pair. The modulated signal will, in turn, be demodulated at a corresponding modulation circuit 28, FIG. 5, in the power control element 14, as detailed in Eaves 2012 and the Eaves Communication Patent. Using this communication method or standard industry wired or wireless communication methods symbolized by line 37 of FIG. 7, the transmitter and receiver components can execute algorithms to optimize the factors of:

customer satisfaction by optimizing charger access, charging time, cost, battery pack life and performance;

avoiding grid capacity overload and operational modes that would result in higher costs for electricity; and advantageous use of alternative energy sources.

Optimization of these factors can include accessing information on the battery pack being charged, such as the battery pack's state-of-charge, capacity, age, and/or temperature. The data may be available from the battery pack control system through an industry standard wired or wireless communication interface symbolized by line 39 of FIG. 7.

Figure 9:
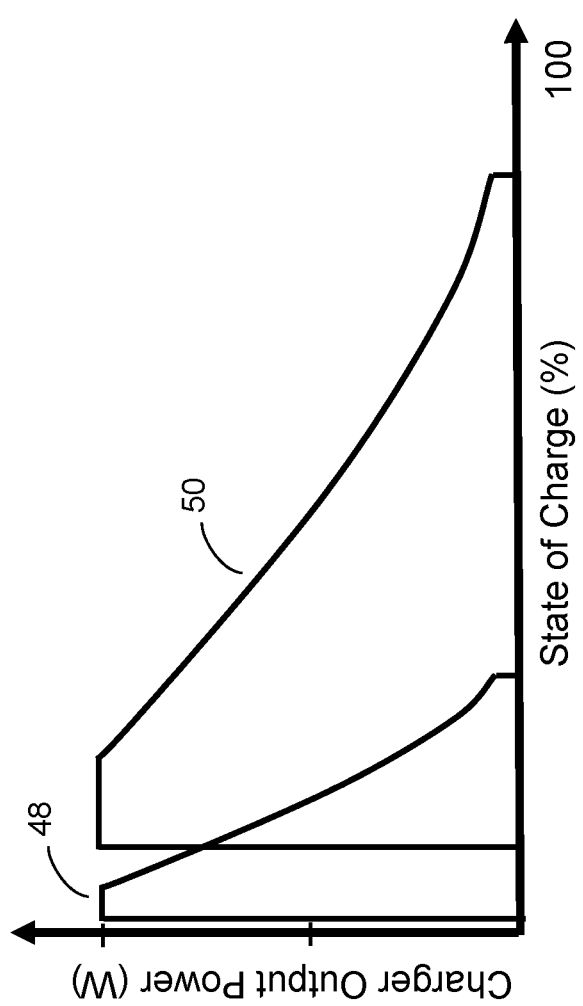
FIG. 9 shows the charging power profile of two batteries of varying capacity.

Specifically, the system can be configured to allow custodians of the charger system to implement custom algorithms to achieve the above factors. Of note is that customers may choose to trade off the balance of charging time and cost; for example, if the customer has more time available to charge, then he/she may choose to select a lower charging rate if it is offered at a lower price. In another example, since battery life is reduced at higher temperatures caused by fast charging, the urgency of fast charging may be traded off with the financial impact of reduced battery life when optimizing customer satisfaction. In one implementation, depicted in FIG. 9, the charge profile of a lower-capacity battery pack 48 is to be a simultaneously charger with a higher-capacity battery pack 50. By communicating with the battery pack control system, the charger can determine that overall customer satisfaction is optimized by allocating more system power to the lower-capacity battery pack 48 because its demand for power will diminish quickly and free up capacity for the higher-capacity battery 50. In this way, the lower-capacity battery pack 48 can be removed from the charging point earlier allowing access for another customer.

The battery pack control system may also communicate a specific charge algorithm to the local charge point that executes a charge profile deemed appropriate by the battery pack or vehicle manufacturer. The battery pack 3 or vehicle 4 can also communicate just an identification number for the charge algorithm to be retrieved from a remote computer server over a public or private computer network.

Similarly, the optimization of overall charging times for customers may best be served by allocating more charging capacity to a battery pack 3 that is at a very low state of charge that is less than that of others attached to the charging system. Specifically, the bulk converter 12 of FIG. 4 may be reduced in voltage to service a battery pack voltage at a low charge state. In some cases, if the other battery packs 3 attached to the system are at a higher charge state, and, therefore, higher voltage, the overall combination of bulk converter 12 and the additive power converter associated with the higher charge-state battery packs 3 might not produce a high-enough voltage to charge. In this case, the algorithm controlling the system can be stored as software code nontransiently stored in the memory of a microprocessor that is in communication with components in the system and that sends commands to those components to control their operation. The algorithm can be used to select and charge the lower charge-state battery 3 first and defer charging any other battery packs 3 via commands generated to the power couplings for charging. Because it is a characteristic of batteries to rise in voltage very quickly when at a lower charge state, the delay in charging the other battery packs 3 will be relatively short, particularly if more system power is allocated to the lower charge-state battery 3.

RAMIFICATIONS

Although the digital power transmitter 1 of FIG. 1 is shown as being powered by a grid connection, the transmitter could be powered by an alternative source, such as wind or solar, or be supplemented by an energy storage device, such as a battery or fuel cell. The system control algorithms can be designed to best utilize a balance of grid and alternative energy sources.

Figure 10:
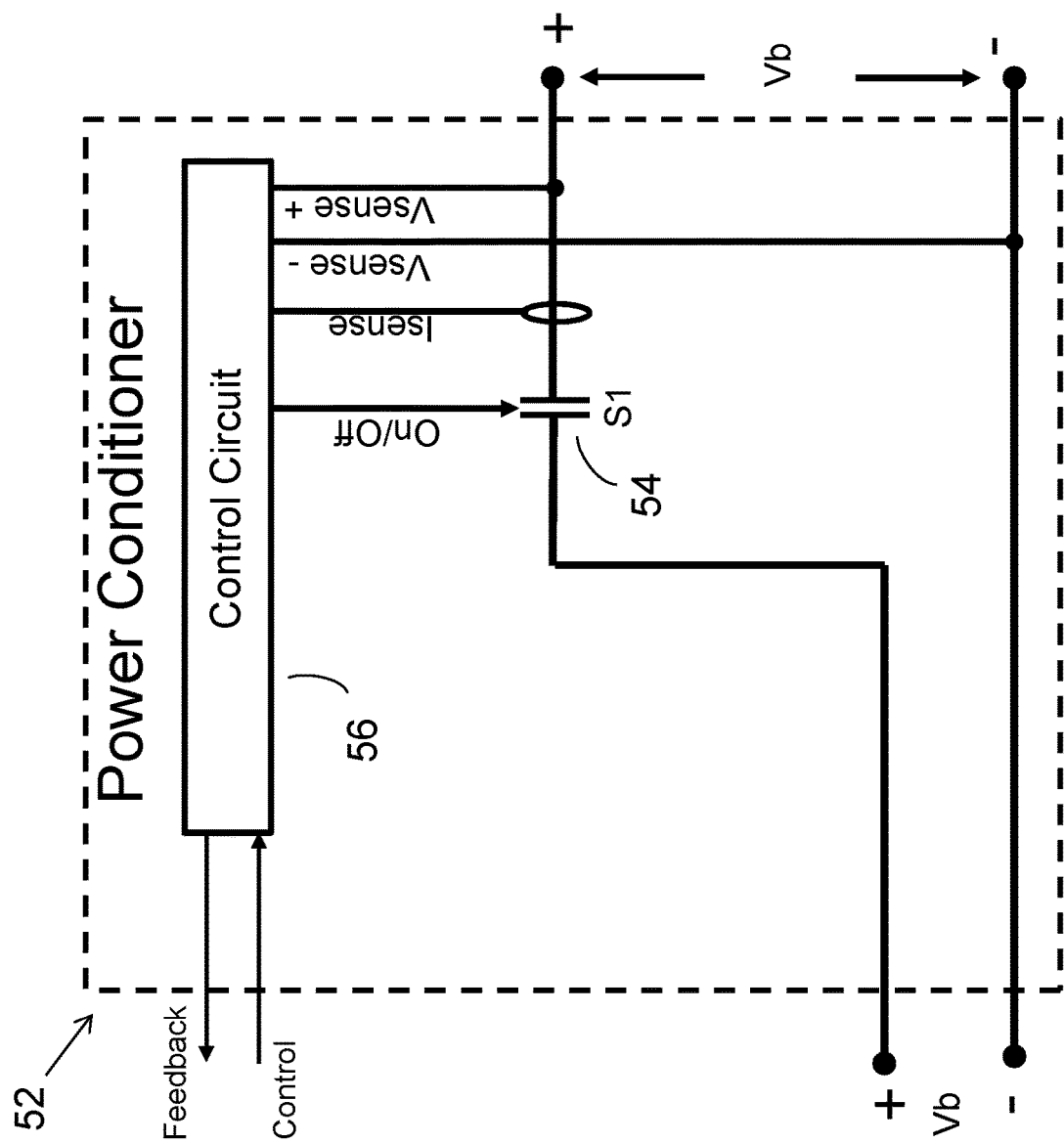
FIG. 10 is a block diagram of a power conditioner without an internal power converter.
Figure 11:
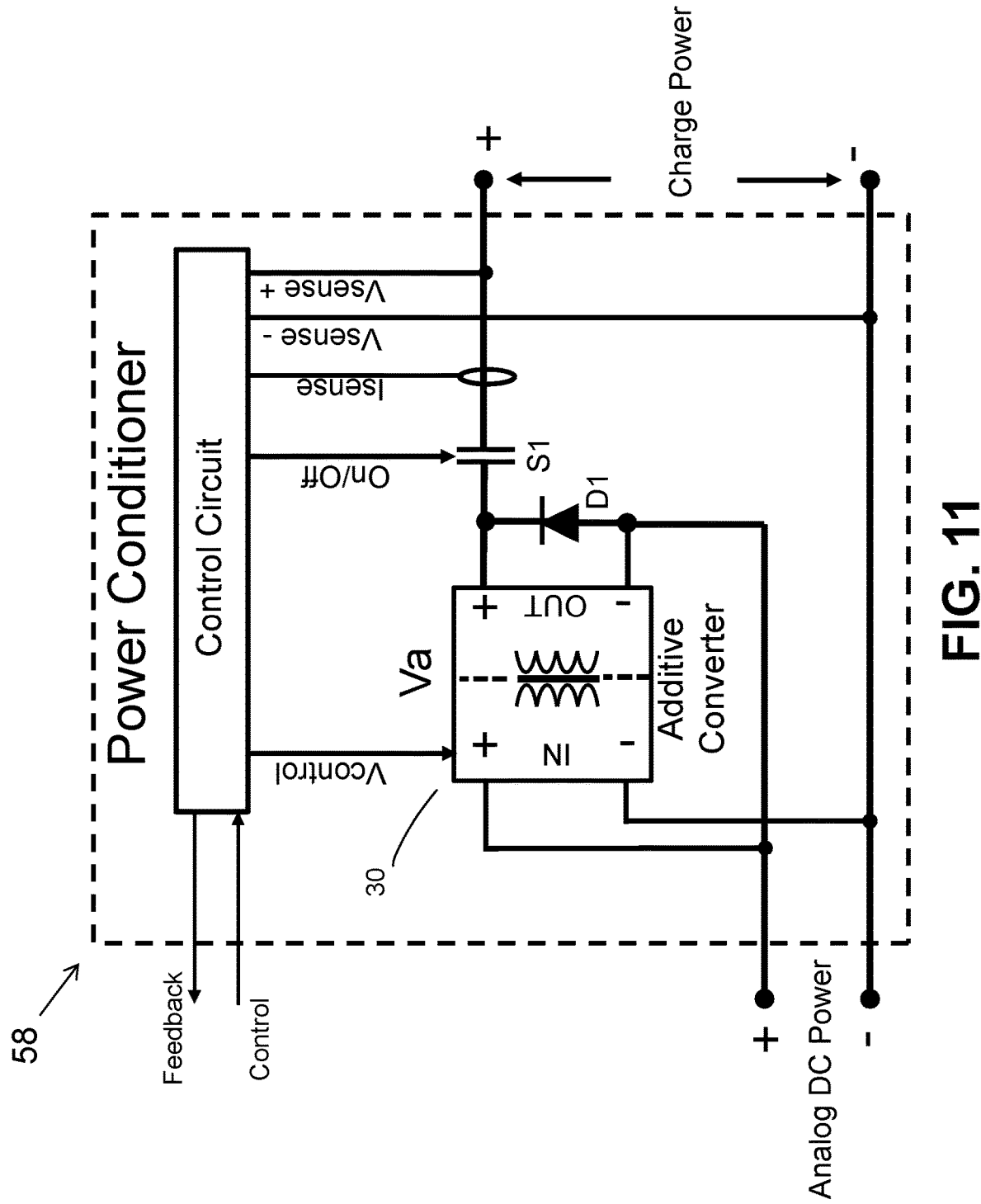
FIG. 11 is a block diagram of a power conditioner containing an internal power converter.

In FIG. 6, additive power converter 30 is part of the digital power transmitter 1 by way of serving as the power conditioner 18 of FIG. 5. This is true for each instance of the power control element 14, 14', 14" that serves the individual output ports of the transmitter 1. In an alternative configuration, the additive power converter 30 can be integrated into the receiver 2 rather than into the transmitter 1. Receivers 2 that include power converters or power conditioners were described in the Eaves Receiver Patent. In this case, each of the power control elements 14, 14', 14" in the transmitter uses the power conditioner 52 depicted in FIG. 10 rather than the power conditioner 18 depicted in FIG. 6. In the embodiment of the power conditioner 52 shown in FIG. 10, the conditioner 52 integrates a disconnect switch (S1) 54 with the control circuit 56 that inputs sensing points for current and voltage. A suitable power conditioner 58 for the alternative placement in the receiver 2 is depicted in FIG. 11. The conditioner 58 is nearly identical to the configuration that would otherwise be implemented in the transmitter 1. However, in FIG. 11, the additive power converter 30 has its input wired to the analog DC power available in each instance of receivers 2, 2', 2", 2''' (as shown in FIG. 1) rather than having its input wired to grid power, as depicted in FIG. 6.

Thus far, additive power converters 30 have been depicted as producing a positive voltage output in relation to the voltage output of the bulk converter 12. In practice, an additive power converter 30 can instead be used in these embodiments so as to produce a voltage that is negative in relation to the voltage of the bulk converter 12 such that the algebraic sum of the voltage of the bulk and additive power converter 12 and 30 is less than the voltage of the bulk converter 12 alone.

Many electric vehicles contain an onboard charger unit that is traditionally designed for connection to an AC mains receptacle that may be found in public areas or in a residence. The onboard charger is typically designed with a "universal mains" input capability to accept a wide range of AC voltages and frequencies (e.g., 100-250 VAC and 50-60 Hz). A universal mains charger will typically also accept— and operate efficiently with—a DC input voltage that is sourced from the bulk power converter described in the present invention, thereby allowing the onboard charger to be used as an alternative form of the additive power converter. Referring to FIG. 2, the onboard charger can supply the first 20% of the battery charge, thus bringing the battery voltage up to a point where the remaining charge occurs over a smaller voltage range and allowing a more-optimized design for the bulk power converter.

The instances of the digital power receiver 2, 2', 2", 2''' are somewhat simplified in this specification. In practice, the receiver control circuit 40 can be used for additional functions, such as servicing an operator display for control and financing functions, such as interacting with the user to process payment authorization and to offer options on the level of service provided. The receiver control circuit 40, particularly when the additive power converter 30 is local to the receiver 2, can perform local control of the additive power converter 30 to control the charge profile to the battery pack 3 to which it is attached.

The bulk power converter 12 of FIG. 4 can be implemented as a combination of a polyphase power transformer combined with a rectifier circuit for AC-DC conversion. In this case, the additive power converters 30 of FIG. 6 can be controlled to reduce the voltage ripple sometimes associated with transformer-rectifier circuits by controlling the output of the additive power converters 30 to produce a waveform that is 180 degrees out of phase with the rectifier circuit ripple.

As earlier described in the specifications of Eaves 2012, the Eaves Receiver Patent, and Lowe 2014, at times the flow of energy in the system can reverse, where power is extracted from a battery pack and distributed to another battery pack, to the grid, or to an energy storage device. In the cases of distributing back to the grid, such a process is known to the industry as vehicle-to-grid operation.

In one instance, depicted in FIG. 1, an internal digital power receiver 2" is shown. In this case, the receiver 2" is embedded directly in a vehicle allowing a safe digital electricity connection where the user never risks exposure to conventional DC voltages.

The communications signal 19 of FIG. 5 and 37 of FIG. 7 can be implemented using various methods and protocols well known to those skilled in the art. Communication hardware and protocols can include RS-232, RS-485, CAN bus, Firewire and others. The communication link can be established using copper conductors, fiber optics or wirelessly over any area of the electromagnetic spectrum allowed by regulators, such as the Federal Communications Commission (FCC), as set forth in Part 18 of the FCC Rules. Wireless communication can be established using any of a number of protocols well known to those skilled in the art, including Wi-Fi, IRDa, Wi-Max and others. The data communications can communicate operating information between the source controller and the load controller, wherein the operating information includes at least a value indicative of the voltage across the load terminals that is acquired by the load controller.

Another option for implementing communication using the modulator/demodulator circuit 28 (in FIG. 5) and 46 (in FIG. 8) is to employ what is referred to by those skilled in the art as "communication over power lines", or "communication over power line carrier" (PLC), also known as "power line digital subscriber line" (PDSL), "mains communication", or "broadband over power lines" (BPL). For example, referring to FIG. 5, communication signals generated by the control circuit 20 are superimposed on the digital power transmission lines using the modulator/demodulator 28. The hardware and software methods of the modulator/demodulator circuit 28 of FIG. 5 are well known to those skilled in the art. An identical implementation is shown as the modulator/demodulator 46 in FIG. 8, which receives communication control signals from the control circuit 40 of FIG. 7, allowing bidirectional communication between the transmitter 1 and receiver 2.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by 1/100th, 1/50th, 1/20th, 1/10th, 1/5th, 1/3rd, 1/2, 2/3rd, 3/4th, 4/5th, 9/10th, 19/20th, 49/50th, 99/100th, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A multiport charging system, comprising;
a plurality of charging ports, each configured for coupling to a respective battery pack;
a centralized bulk converter electrically coupled with the charging ports and controllable to provide a relatively constant first output voltage selected to provide a majority of a total charge power required for recharging all battery packs attached to the charging ports;
a plurality of additive power converters, wherein each additive power converter is assigned to an individual charging port and is configured and controllable to provide a second output voltage that is lower than the first output voltage provided to the same charging port and that, when added to the first output voltage, results in a predetermined charge to the charging port to which it is assigned; and
a control circuit configured to monitor at least the electrical current leaving the charging ports to control at least the second output voltage of the additive power converters to individually control a charging current to the battery packs attached to the charging ports based on an algorithm that optimizes at least one factor selected from customer satisfaction, price of electricity, maximizing charge rate, available capacity from a power source, and battery life, wherein the control circuitry is further configured to vary the second output voltage more greatly than is the relatively constant first output voltage provided to the same charging port.

2. The multiport charging system of claim 1, wherein the additive power converters are placed local to the bulk converter.

3. The multiport charging system of claim 1, wherein the additive power converters are placed local to the battery pack being charged.

4. The multiport charging system of claim 1, wherein at least one of the additive power converters is an existing onboard charger of an electric vehicle.

5. The multiport charging system of claim 1, wherein the bulk converter is embedded in a digital power transmitter configured to transmit power in digital power format to multiple remote digital power receivers local to the charging ports, and wherein the digital power receivers are configured to convert digital power back to conventional analog power for charging battery packs attached to the charging ports.

6. A method for charging a plurality of battery packs, the method comprising:
controlling a centralized bulk converter to provide a relatively constant first output voltage through a plurality of charging ports to respective battery packs coupled with the charging ports, wherein the first output voltage is selected to provide a majority of a total charge power required for recharging all battery packs attached to the charging ports;

controlling a plurality of additive power converters, each assigned to an individual charging port, to provide a second output voltage that is lower and more variable than the first output voltage provided to the same charging port and that, when added to the first output voltage, results in a predetermined charge to the charging port to which it is assigned; and operating a control circuit to monitor at least the electrical current leaving the charging ports to control at least the second output voltage of the additive power converters to individually control a charging current to the battery packs attached to the charging ports based on an algorithm that optimizes at least one factor selected from the following factors: customer satisfaction, price of electricity, maximizing charge rate, available capacity from a power source and battery life, wherein the control circuit controls the second output voltage of the additive power converters to be lower than the first output voltage and to vary the second output voltage more greatly than the relatively constant first output voltage provided to the same charging port from the centralized bulk converter is varied.

7. The method of claim 6, wherein the control circuit generates a signal that offers an option for a lower price per unit of energy in exchange for a longer charging period to an owner of at least one of the battery packs.

8. The method of claim 6, wherein the control circuit executes an algorithm that is at least in part determined by information stored in control circuitry in at least one of the battery packs.

9. The method of claim 6, further comprising adjusting the first output voltage to a reduced voltage necessary to accommodate the lowest-voltage battery pack attached to the system, and adjusting the bulk converter voltage upwards as the lowest-voltage battery pack charges.

10. The method of claim 9, wherein the control circuit acts to adjust the first output voltage downward to accommodate a battery pack at a low charge state wherein, because batteries at a low state-of-charge have voltage characteristics that rise rapidly during a first portion of the charge process, any loss or reduction in charging rate to higher charge-state battery packs due to a reduced voltage from the bulk converter will be temporary.

11. The method of claim 6, further comprising using the additive power converters to produce a negative voltage in relation to the bulk converter, wherein adding the output voltage of the bulk converter and output voltage of the additive power converter results in a combined voltage that is less than that of the bulk converter.

12. The method of claim 6, wherein at least one of the additive power converters is an existing onboard charger of an electric vehicle.

* * * * *